United States Patent [19]

Gebien

[11] 3,997,761
[45] Dec. 14, 1976

[54] SELF-CLEANING FOOD SUPPORTING GRILL
[75] Inventor: Willard Gebien, Mundelein, Ill.
[73] Assignee: Bel-Air Tool, Die & Engineering Company, Chicago, Ill.
[22] Filed: Feb. 10, 1976
[21] Appl. No.: 656,789
[52] U.S. Cl. .............................. 219/463; 219/467; 219/536; 219/552; 338/287
[51] Int. Cl.² ......................................... H05B 3/68
[58] Field of Search .......... 219/443, 445, 460, 463, 219/467, 468, 521, 536, 552; 99/400, 385; 338/280, 281, 287, 290, 293, 318, 319; 13/25; 126/25 R

[56] References Cited
UNITED STATES PATENTS

| | | | |
|---|---|---|---|
| 2,843,716 | 7/1958 | Del Francia | 219/447 |
| 3,022,410 | 2/1962 | Savio | 219/463 X |
| 3,023,298 | 2/1962 | Wells | 219/445 |
| 3,350,543 | 10/1967 | Berger et al. | 219/447 |
| 3,781,525 | 12/1973 | Joeckel | 219/532 |
| 3,800,777 | 2/1974 | Gebien | 126/25 R |

*Primary Examiner*—Yolodymyr Y. Mayewsky
*Attorney, Agent, or Firm*—Edward L. Benno

[57] ABSTRACT

A simple, relatively electrically safe self-cleaning food supporting grill construction comprising a serpentine steel tubing for supporting food over a cooking fire and through which an electrical current from a conventional household electrical supply is passed to burn food residues from the tubing, and in which the grill is used in cooking units that render the grill easily accessible to being touched or handled by a person, such as in a barbeque cooking unit.

6 Claims, 6 Drawing Figures

SELF-CLEANING FOOD SUPPORTING GRILL

BACKGROUND OF THE INVENTION

Many types of wire grills are known which are suitable for supporting food over a cooking fire. Further, many types of electrically energized or heated grills are known for use in one way or another in a cooking process. However, food supporting grills for use with a separate cooking fire or heat source that can be cleaned by the connection of conventional household electrical power thereto and that are used in cooking units such as outdoor barbeque cooking units where the grill is in a relatively exposed condition to being touched or handled by a person are not easily and simply assembled by combining known wire grills and electrical heating because of the inherent problem of electric shocks to persons handling such units. Although electrical shock hazards can be greatly reduced by completely electrically insulating the grill wires, such arrangements complicate the construction and substantially increase the cost of such grills.

A basic cooking unit having a grill of the type over which the subject invention is an improvement is shown in my U.S. Pat. No. 3,800,777.

SUMMARY OF THE INVENTION

The grill of the subject invention is extremely simple in its construction but, considering that the food supporting wires are not electrically insulated, is relatively safe for use in cooking units such as outdoor barbeque units where the grill is relatively easily accessible to being directly touched or handled by a person using the cooking unit.

Simplicity and relative safety are achieved by providing two sections of steel tubing which are bent into serpentine configurations. The two tubing sections are placed side-by-side with the reverse bend ends of the tubing sections disposed midway between the two legs of a channel member assembly comprising a pair of spaced apart channel member sections, and a ceramic-like cement material is poured or otherwise cast within the channel member sections and about the reverse bend ends. Once the cement material has set, the channel member assembly and the tubing sections are firmly integrally joined as a sturdy grill unit. Because the tubing is not confined within a rigid perimeter, the straight tubing sections can change in length with changes in temperature without distorting and possibly producing a short circuit.

The two straight side-by-side or adjacent runs of the two tubing sections at the center of the grill are connected within the channel member assembly to a pair of male plug terminals which extend outwardly of the center side wall of the channel member assembly between the two spaced apart legs thereof. The other ends of the two tubing sections which are the outwardmost runs, are interconnected by an electrical conductor extending therebetween within the channel member assembly.

The ceramic-like cement material is selected from known materials which are good electrical insulators, good thermal conductors, and high in strength and bonding characteristics when cast in place as described.

In the resulting grill as described the highest electrical potential will be between the two center side-by-side tubing runs of the two serpentine tubing sections when a source of electrical power is connected to the male plug terminals. That area is the least likely area of a grill that a person may accidently grasp with two hands. The more likely area, the outward most ends are at the same electrical potential, and relative to ground potential that electrical potential will be one half of the total applied electrical potential.

The steel tubing of the grill provides substantial structural strength for its use as a food supporting surface and permits the total electrical resistance to be conveniently matched to a conventional household electrical service. Further, the simple hollow steel tubing permits the grill construction to be substantially economical and provides for effective electrical connection between the tubing sections, the plug terminals, and the electrical conductor by a simple swaging of the tubing.

The ceramic-like cement material, in addition to producing a sturdy unitary assembly, electrically insulates the tubing from the channel member assembly, allows the heated reverse bends to conductively heat the channel member assembly to aid in cleaning the channel member assembly, and supports and electrically insulates the male plug terminals and the electrical conductor which connects the outwardmost tubing runs.

The primary object of the present invention is to provide an economical, simple and relatively safe self-cleaning food supporting grill construction in which the food supporting elements are not electrically insulated.

Other objects and features of the invention will be apparent upon a perusal of the hereinafter following specification read in conjunction with the drawing.

DETAILED DESCRIPTION OF A PREFERRED EMBODIMENT

The preferred embodiment of the grill of the subject invention is a grill 10 which is rectangular in shape and rests upon a cooking unit 11.

The cooking unit 11 is intended to carry a cooking fire below the grill 10 for cooking any food placed upon the grill 10. The invention contemplates that the grill 10 may alternatively be mounted below a cooking fire or heat source such as in some types of food broiling units. The invention does not contemplate that the grill 10 can be electrically heated for the cooking of any food.

The grill 10 comprises a channel member assembly of two channel member sections 12 and 13, and two tubing sections 14.

Figure 3:
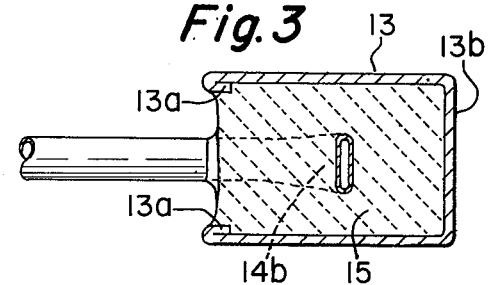
FIG. 3 is an enlarged cross sectional view of a portion of the grill and taken substantially along the line 3—3 of FIG. 2.
Figure 4:
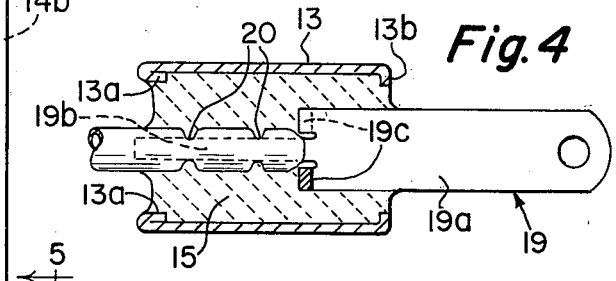
FIG. 4 is an enlarged cross sectional view of another portion of the grill and taken substantially along the line 4—4 of FIG. 2.
Figure 6:
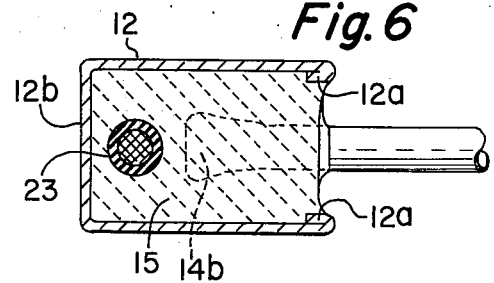
FIG. 6 is an enlarged cross sectional view of another portion of the grill and taken substantially along the line 6—6 of FIG. 2.

Each of the channel member sections 12 and 13 is U-shaped in transverse cross section as may be seen in FIGS. 3, 4 and 6. A suitable material for the channel sections 12 and 13 is stainless steel with a wall thickness of about 0.032 inches. In the preferred embodiment the ends of the legs of the channel sections 12 and 13 are folded inwardly through an angle of 180° such as shown at 13a in FIGS. 3 and 4 and at 12a in FIG. 6. That folding of the ends of the legs of the channel sections 12 and 13 serves to provide shoulders which aid in mechanically locking the ceramic-like cement 15 within the channel sections 12 and 13.

The cross walls 12b and 13b of the channel sections 12 and 13 are of a transverse dimension or height substantially greater than the diameter of the tubing sections 14 to space the legs of the channel sections 12 and 13 a substantial distance from the tubing sections to avoid any accidental electrical connection between the channel sections 12 and 13 and the tubing sections 14 in the normal use of the grill.

No fixed members are provided for the grill between the ends of the channel sections 12 and 13 so that the channel sections 12 and 13 can move toward and away from each other as the straight sections of the tubing sections 14 undergo any change in length as they undergo changes in temperature. In the alternative, end walls may be provided for the grill if they have substantially the same thermal expansion and contraction rate as the straight sections of the tubing sections 14 or if the end walls are constructed with telescoping members capable of changing in length.

Each of the tubing sections 14 is bent into a serpentine shape of straight sections 14a and reverse bend end sections 14b. The straight sections 14a are disposed in a substantially parallel spaced apart relationship and the spacing between the straight sections 14a is selected to provide a convenient spacing to support most foods which are to be cooked upon the grill.

In a preferred embodiment the material of the tubing sections 14 is stainless steel with a tubing wall thickness of 0.010 inches and an outside diameter of 0.125 inches. In one reduction to practice with such a material, it was found that if each tubing section had a length of 23 feet, or a total length of 46 feet for the complete grill, a 15 ampere fused branch circuit of a household electrical supply of 110 volts A.C. when connected to the grill would cause the tubing sections 14 to resistance heat to a temperature sufficient to reduce all normal food residues on the tubing sections 14 to ash within a few seconds.

Figure 1:
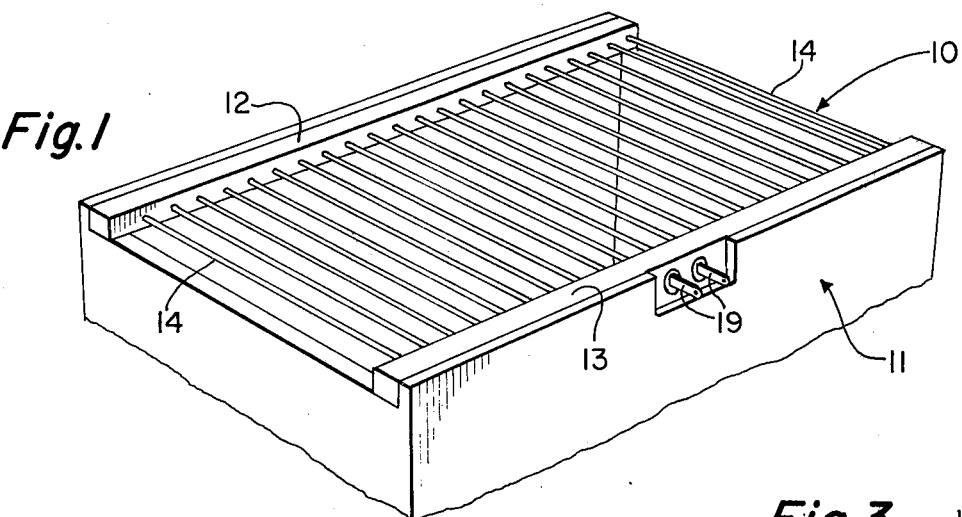
FIG. 1 is an isometric view of a grill constructed according to the invention and mounted on a cooking unit.
Figure 2:
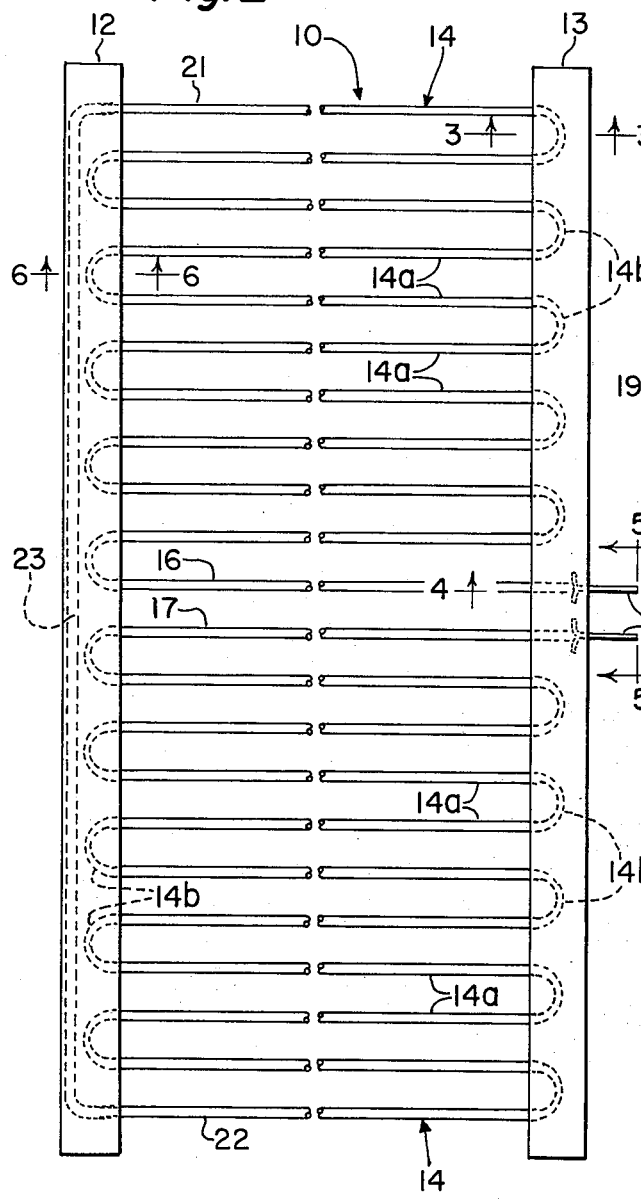
FIG. 2 is a plan view of the grill of FIG. 1.

The two tubing sections 14 are disposed in a side-by-side relationship as may be seen in FIG. 2 with the reverse bend end sections 14b within the channel sections 12 and 13. The two adjacent center straight sections or runs 16 and 17 terminate within the channel section 13 and in axial alignment with the holes 18 in the channel section 13 which may be seen in FIG. 5.

The male electrical terminals 19 are formed to have blade sections 19a and integral studs 19b extending rearwardly thereof. The terminals 19 further have integral transversely extending bosses or shoulders 19c for mechanically locking the terminals 19 within the cement 15. The stud sections 19b of the terminals 19 are inserted within the ends of the tubing runs 16 and 17 and are mechanically locked therein and electrically connected thereto by a swaging 20 of the tubing as may be seen in FIG. 4.

Figure 5:
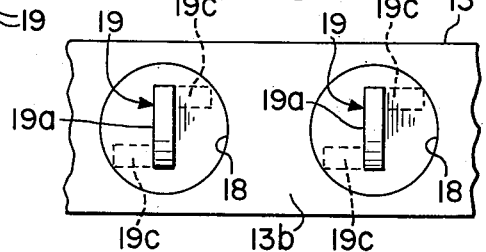
FIG. 5 is an enlarged side elevational view of a portion of the grill and taken substantially along the line 5—5 of FIG. 2.

When the tubing sections 14 are positioned in the channel section 13 as may be seen in FIGS. 2, 4 and 5, the blade sections 19a of the male plug terminals 19 extend outwardly of the side wall 13b of the channel section 13 through the holes 18. The holes 18 have a diameter substantially larger than the largest transverse dimension of the blade sections 19a to avoid any electrical connection between the plug terminals 19 and the channel section 13.

The outboard or most widely separated straight tubing runs 21 and 22 of the tubing sections 14 terminate within the channel section 12. An insulated conductor 23 is also disposed within the channel section 12 and the ends of the conductor 23 are swaged within the ends of the tubing runs 21 and 22 to electrically interconnect the tubing runs 21 and 22. The conductor 23 is spaced from the tubing reverse bends 14b and from the side wall 12b of the channel section 12.

The invention contemplates that alternatively the conductor 23 may be an uninsulated conductor and that it be appropriately insulated in the grill upon being cast or molded in the cement 15.

The invention further contemplates that each tubing section 14 may in the alternative comprise an even number of straight tubing runs so that the outboard tubing runs terminate within the channel section 13 rather than within the channel section 12 as shown. In that alternative embodiment, the conductor 23 is then disposed within the channel section 13 and must pass over the ends of the tubing runs 16 and 17 without being electrically shorted thereto.

With the various parts of the grill 10 arranged as described above, the cement 15 is molded or cast within the channel sections 12 and 13 and about the tubing reverse bends 14b, the plug terminals 19 and the conductor 23. The cement 15 is a ceramic-like cement selected from known compositions which are good electrical insulators, good thermal conductors, and which when set will bond well to the walls of the channel sections 12 and 13 and about the tubing sections 14 and will have good structural strength properties. In one reduction to practice it was found that a commercially available Zircon base cement sold under the trade name Sauereisen No. 29 Low Expansion Cement satisfied the listed requirements for the cement 15.

In the described arrangement of the grill 10, the straight tubing runs 14a may change in length when heated without warping because the channel sections 12 and 13 are not restrained against movement relative to each other. If desired, the ends of the channel sections 12 and 13 may be interconnected by end frame members that do not prevent relative movement between the channel sections 12 and 13.

In use the grill 10 is conventionally supported on a cooking unit 11 by any known brackets which engage the channel sections 12 and 13 and which avoid any electrical connection to the tubing sections 14. A cooking fire or heat source in the cooking unit 11 and spaced from the grill 10 will enable a person to cook food placed upon the grill 10.

In time, as is well known, food residues will accumulate and firmly crust on the grill 10. A source of electrical power, such as from a standard household electrical supply of 110 volts A.C., is then connected to the grill 10 through a conventional female plug applied to the male plug terminals 19. The tubing sections 14 will then resistance heat to burn the accumulated food residues therefrom, and normally in a period of a few seconds. Substantial heat will also be conducted from the reverse tubing bends 14b, through the cement 15, to the channel sections 12 and 13 to burn or loosen food residues which may have splattered thereon during the food cooking process. When the source of electrical power has been disconnected from the grill 10, the grill 10 may be wiped or dusted to remove the burned food residues.

From the foregoing description it is apparent that the grill 10 of the subject invention is extremely simple in construction and yet relatively safe for its intended purposes. If desired, additional safety against accidental electrical shock to a person may be gained by providing the cooking unit 11 with a cover that is closed during cleaning of the grill. Further, such a cover may be provided with a known electrical disconnect that will break power to the grill 10 if the cover is raised or removed.

Having described the invention, it is to be understood that changes can be made in the described embodiment by one skilled in the art within the spirit and scope of the hereinafter following claims.

I claim:

1. A self-cleaning food supporting grill construction comprising, a steel tubing bent into a serpentine shape of a plurality of substantially spaced apart and parallel straight sections interconnected by reverse bend end sections, male electrical plug terminals electrically connected to the ends of said tubing for the connection of a source of certain electrical power directly to said tubing, said tubing having an electrical resistance related to said source of certain electrical power to resistance heat to a temperature sufficient to burn any food residues from the surface of said tubing upon the connection of said source of certain electrical power to said male plug terminals, a metal channel member substantially U-shaped in transverse cross-section, the legs of said channel member being spaced apart a distance substantially greater than the diameter of said tubing, the reverse bend end sections of said tubing being disposed within said channel members substantially midway between the legs thereof, and a thermally-conductive electrically-insulative ceramic-like cement molded in place within said channel member and about said reverse bend end sections of said tubing to rigidly support said tubing in said serpentine shape within said channel member and electrically insulated from and in thermal conductive contact with said channel member.

2. A self-cleaning food supporting grill construction as defined in claim 1, said reverse bend end sections being aligned on two parallel spaced apart lines, said channel member comprising a pair of channel member sections and each of said channel member sections mounted about said reverse bend end sections aligned on one of said lines.

3. A self-cleaning food supporting grill as defined in claim 2, and said pair of channel member sections being devoid of any interconnection preventing said straight sections of said tubing from changing in length responsive to changes in temperature thereof.

4. A self-cleaning food supporting grill construction as defined in claim 1, the section of said channel member interconnecting the legs thereof having two holes therethrough each of a diameter substantially larger than the largest transverse dimension of said plug terminals, each of said plug terminals extending through one of said holes for the connection of said source of certain electrical power thereto, and said ceramic-like cement being molded about said plug terminals to rigidly support said plug terminals through and centrally of said holes to electrically insulate said plug terminals from said channel member.

5. A self-cleaning food supporting grill construction as defined in claim 4, said tubing comprising two adjacent serpentine sections each of an equal number of straight sections and reverse bend end sections, the ends of the two adjacent straight sections of said two serpentine sections being directly connected to said plug terminals within said channel member, the other ends of said two serpentine sections terminating within said channel member, an electrical conductor extending within said channel member and between the other ends of said two serpentine sections, said other ends of said two serpentine sections being connected to the ends of said electrical conductor, and said electrical conductor being embedded in said ceramic-like cement.

6. A self-cleaning food supporting grill construction as defined in claim 5, and the direct connection of said ends of the two adjacent straight sections of said two serpentine sections to said plug terminals comprising a swaging of said straight sections about the ends of said plug terminals within said channel member, and the connection of said other ends of said two serpentine sections to said electrical conductor comprising a swaging of said other ends about the ends of said electrical conductor.

* * * * *